United States Patent [19]

Mueller et al.

[11] 4,209,994
[45] Jul. 1, 1980

[54] HEAT PUMP SYSTEM DEFROST CONTROL

[75] Inventors: Dale A. Mueller, St. Paul; Stephen L. Serber, New Hope, both of Minn.

[73] Assignee: Honeywell Inc., Minneapolis, Minn.

[21] Appl. No.: 954,141

[22] Filed: Oct. 24, 1978

[51] Int. Cl.² .................. F25D 21/06; F25B 41/00
[52] U.S. Cl. ............................. 62/155; 62/156; 62/209; 62/234
[58] Field of Search .................. 62/155, 156, 234, 209

[56] References Cited

U.S. PATENT DOCUMENTS

| | | | |
|---|---|---|---|
| 3,126,712 | 3/1964 | Gebert | 62/156 X |
| 3,170,304 | 2/1965 | Hale | 62/160 X |
| 3,170,305 | 2/1965 | Dibble et al. | 62/155 |
| 3,400,553 | 9/1968 | Orbesen | 62/160 X |
| 3,460,352 | 8/1969 | Lorenz | 62/155 X |
| 3,759,049 | 9/1973 | Bell et al. | 62/155 X |
| 3,854,915 | 12/1974 | Schulze-Berge et al. | 62/155 |

Primary Examiner—William E. Wayner
Assistant Examiner—Harry B. Tanner
Attorney, Agent, or Firm—Roger W. Jensen

[57] ABSTRACT

A control system for a reverse cycle refrigeration system for controlling the defrosting of the outdoor coil thereof on a cost effective basis; the control system comprising a controller means receiving inputs indicative of the outdoor air temperature, the temperature of the outdoor coil, and the operation of the compressor means; the controller means having a timing function which is initiated upon the outdoor coil temperature being at or below a preselected value and the compressor means being operated; the duration of the timing function being determined on a substantially continuous basis as a function of the magnitude of the outdoor air temperature; and the controller means having an operative connection to the system so as to, upon completion of the timing function, place the reverse cycle refrigeration system into an outdoor coil defrost mode of operation.

11 Claims, 5 Drawing Figures

HEAT PUMP SYSTEM DEFROST CONTROL

BACKGROUND OF THE INVENTION

A major problem with heat pumps is that under normal circumstances the outdoor coil will, during the heating mode of operation, have frost accumulate thereon. As the frost thickness increases, the overall efficiency of the system decreases dramatically, and energy is wasted. Accordingly, many schemes have heretofore been proposed for detecting the frost and for taking corrective action for removing the frost from the outdoor coil. Examples of prior art systems include the following U.S. Pat. Nos. 3,170,304; 3,170,305; and 3,400,553.

Two significant factors which determine the rate of accumulation of frost on an outdoor coil during the system heating mode are the relative humidity and the temperature of the outdoor air. In accordance therewith, some prior art systems have attempted to solve the defrost problem by programming a fixed length of time of running the compressor before initiation of the defrost mode of operation based on an assumed value of outdoor air temperature. Further, such systems may be modified insofar as the selection of the number of daily defrost cycles is concerned, by the assumed value of the relative humidity of the outside air. However, such prior art systems are significantly inefficient because usually the actual outdoor temperature differs from the assumed value; further, such systems have not taken into account that the temperature of the outdoor air frequently varies significantly during the heating period. Thus, such systems provide what might be termed optimum control for only a single outdoor temperature and then only if there is no change in outdoor temperature during the defrost operation. Such systems usually do not initiate defrost at an optimum point of time; the defrost initiate function occurs either too early or too late. This causes a serious waste of energy. Also, the defrost action is frequently accomplished by reversing the main system to a "cooling" mode; this causes relatively hot refrigerant to be directed to the outdoor coil to melt the accumulated frost. However, this also causes cooling of the controlled building which is in turn typically offset by the use of high cost, lower-efficiency, electric resistance heating; again, energy is wasted.

It is an object of this invention to provide a new, significantly improved and cost effective; i.e., energy saving, defrost control system for a reverse cycle refrigeration system, i.e., heat pump.

SUMMARY OF THE INVENTION

The present invention is an outdoor coil defrost control system for a reverse cycle refrigeration system comprising the usual refrigerant compression means, indoor coil, outdoor coil, and refrigerant conduit means interconnecting the compression means and the coils. In particular, the outdoor coil defrost system comprises outdoor air temperature sensing means having an output indicative of outdoor air temperature, outdoor coil temperature sensing means having an output indicative of the temperature of the outdoor coil, means for producing an output signal indicative of the operation of the compression means, and a special controller means. The special controller means has operative connections to the above recited temperature sensors and compression means operation sensor so as to receive the outputs thereof. The controller has a timing function which is initiated upon the outdoor coil temperature being at or below a preselected value and the compression means being operated. The duration of the timing function is determined on a substantially continuous basis as a function of the magnitude of the outdoor air temperature and the compressor operation. The controller means has an operative connection to the reverse cycle refrigeration system and is adapted, upon completion of the timing function, to place the system into an outdoor coil defrost mode of operation to remove accumulated frost.

The invention may further include an additional or backup method of controlling outdoor coil defrost which is independent of the completion of the above-described timing function. This additional defrost control means is adapted to initiate an outdoor coil defrost mode of operation of the reverse cycle refrigeration system upon the outdoor air temperature exceeding the outdoor coil temperature by a predetermined amount.

The present invention provides a substantial improvement over prior art systems in initiating defrost at the correct time to save energy.

DESCRIPTION OF THE PREFERRED EMBODIMENT

Figure 1:
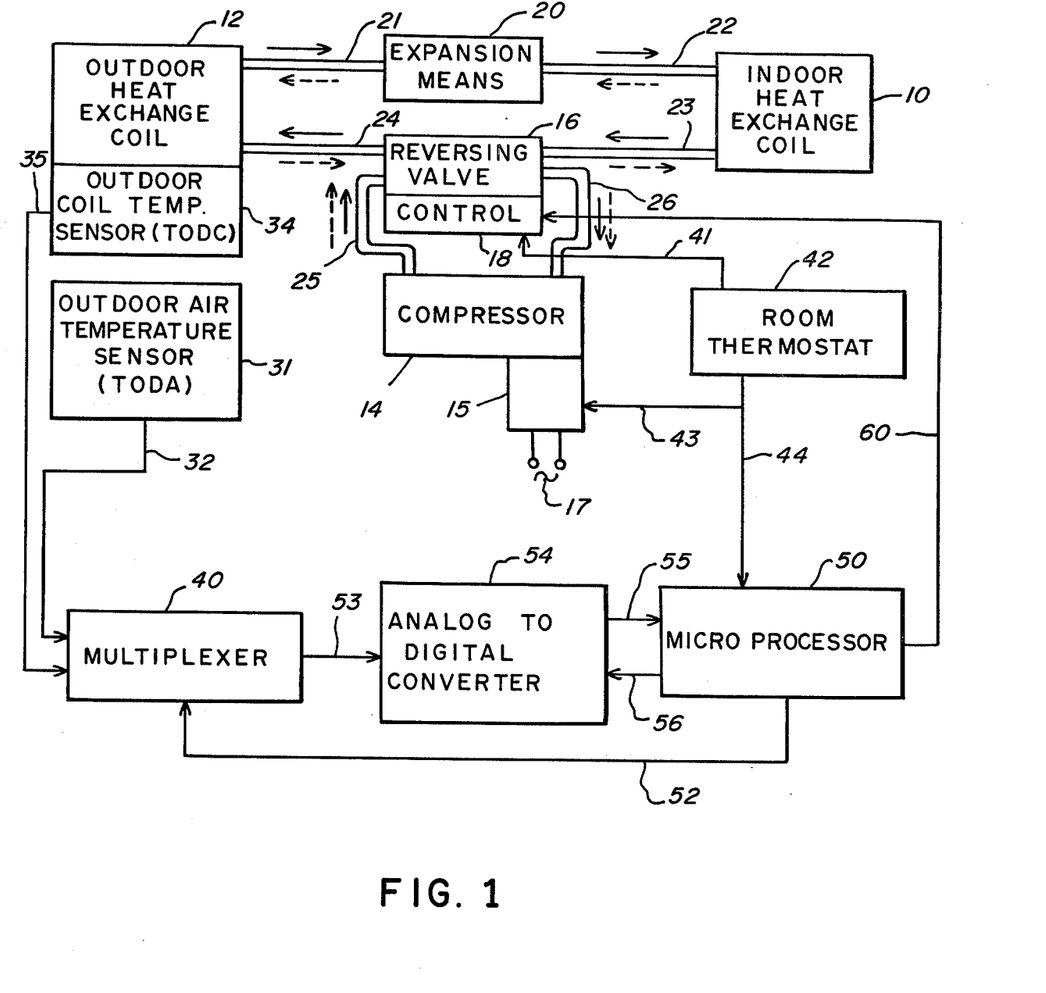
FIG. 1 is a block diagram of a reverse cycle refrigeration system which embodies the present invention.

Referring to the FIG. 1 block diagram of the reverse cycle refrigeration system, including the outdoor coil defrost control system thereof, the refrigeration system comprises an indoor heat exchange coil 10, an outdoor heat exchange coil 12, a refrigerant compression means or compressor 14 and refrigerant conduit means interconnecting the coils and the compressor, the refrigerant conduit means including a reversing valve 16 having a control 18, an expansion means 20, and appropriate piping 21-26. The system as thus far described is old in the art and is exemplified by the above identified patents; e.g., U.S. Pat. No. 3,170,304. Briefly, during the indoor heating mode, i.e., when the reverse cycle system is working to heat the inside of a building, compressor 14 will discharge relatively hot gaseous refrigerant through pipe 25, reversing valve 16 and pipe 23 to the indoor heat exchange coil 10. During the cooling mode, the reversing valve 16 is operated so that the hot gaseous refrigerant from the compressor is routed via pipe 25, reversing valve 16 and pipe 24 to the outdoor heat exchange coil 12.

The defrost control system comprises an outdoor air temperature sensing means 31 which will hereinafter sometimes be referred to as "TODA." Outdoor air temperature sensing means 31 has an output 32 on which is available an output signal indicative of the outdoor air temperature. Output 32 is one of two inputs to a multiplexer 40 to be described in more detail below. The defrost control system further comprises outdoor coil temperature sensing means which hereinafter may be referred to as "TODC" identified in FIG. 1 by the reference numeral 34 having an output lead 35 on which is available an output signal indicative of the temperature of the outdoor coil, lead 35 being connected to multiplexer 40 as the second input thereof.

Compressor 14 is controlled by a controller 15 adapted to be energized from a suitable supply of electric power 17 and to be controlled from a rest or "off" position to an operating or "on" condition as a function of either "heating" or "cooling" control signals applied from a suitable room thermostat 42 through interconnection means 43. The reversing valve 16 is also controlled via a connection 41 by the room thermostat 42 to be in the appropriate position for the commanded system mode of operation; i.e., heating or cooling. The output from the room thermostat 42 is also applied through a connection 44 as a first input to a microprocessor 50. A connection 52 linking the microprocessor 50 and the multiplexer 40 enables the microprocessor to control the multiplexer in a manner well known to those skilled in the art so that appearing at the output 53 of the multiplexer will be either a signal indicative of outdoor air temperature as sensed by TODA 31 or outdoor coil temperature as sensed by TODC 34. The output 53 of the multiplexer 40 is applied as an input to an analog to digital converter 54 which has an output 55 applied to the microprocessor 50 and which receives through connection 56 an input from the microprocessor 50. Analog to digital converter 54 functions to convert the analog temperature signals appearing at input 53 thereof into a digital form for utilization by the microprocessor 50.

The microprocessor 50 has an output connection 60 which is applied to control 18 of reversing valve 16, which in turn controls the mode of operation of the reverse cycle refrigeration system; i.e., either heating or cooling, it being understood that the cooling mode will, as aforesaid, cause the melting and dispersal of any frost on the outdoor coil which had accumulated during the prior heating mode of operation.

A suitable microprocessor that may be used as a component in the system comprising the present invention is the Intel Corporation Model 8049. Further, an appropriate analog to digital converter for use as item 54 is Texas Instruments Inc. Model TL505C (see T.I. Bulletin DL-5 12580); and an appropriate multiplexer is the Motorola Inc. Model MC14051BP. Further, Honeywell Inc., platinum film resistance type temperature sensors Models C800-A and C800-B may be used for TODA 31 and TODC 34 respectively; and Honeywell Inc. Model T872 thermostat may be used for room thermostat 42, the Model T872 being a bimetal operated mercury switch for heating-cooling and including switch means for controlling a plurality of auxiliary heating means. Further, an appropriate heat pump; i.e., components 10, 12, 14, 15, 16, is the Westinghouse Company HI-RE-LI unit comprising outdoor unit Model No. HL036COW and indoor unit AG012HOK.

It will also be understood by those skilled in the art that the functional interconnections depicted in FIG. 1 are representative of one or more electrical wires or pipes, as the case may be, as dicated by the specific equipment used. It will also be understood that the room thermostat means 42 may be referred to as a means which is operatively associated with the compressor 14 and adapted to have an output indicative of the operation of the compressor because operation of the thermostat causes operation of compressor 14 from an "off" to an "on" or operating condition; connection 44 from thermostat 42 to microprocessor 50 thus constitutes an input indicative of compressor operation.

Figure 3:
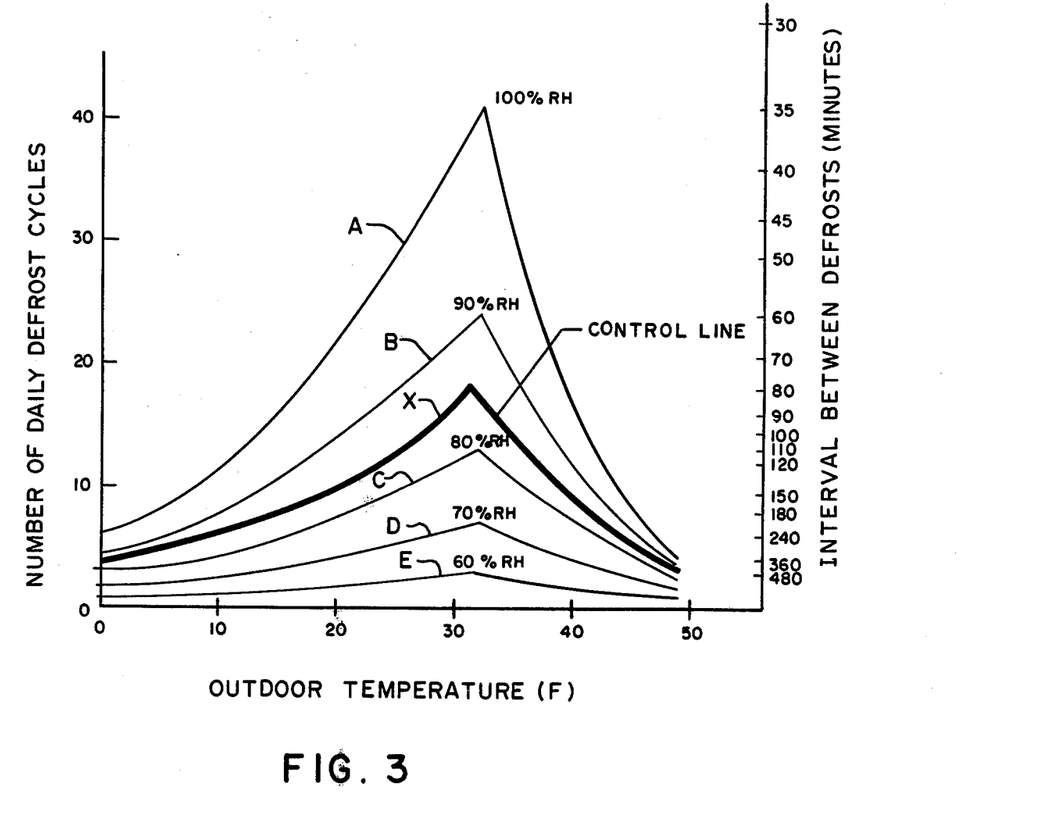
FIG. 3 is a graph showing the relationship between outdoor air temperature and the number of required daily defrost cycles for a typical reverse cycle refrigeration system.

Referring now to FIG. 3, a graph is depicted showing (with reference to the left axis), the typical number of required daily defrost cycles for a heat pump system, and (with reference to the right side) the interval (in minutes) between defrosts plotted as a function of outdoor temperature (in degrees Fahrenheit), a plurality of graphs A, B, C, D and E showing the required defrost cycles (and minutes of compressor running time) for outdoor air relative humidities of 100%, 90%, 80%, 70% and 60% respectively. It will be noted that the maximum requirement for defrosting occurs at 32° F. outdoor temperature, and that defrost frequency requirements increase with an increase in the relative humidity of the outdoor air. The indicated information of FIG. 3 was presented in 1962 by James H. Healy in a paper, "The Heat Pump in a Cold Climate," to the 49th Annual Convention of the National Warm Air Heating and Air Conditioning Association. In FIG. 3 the reference X is used to depict a control line which is selected for the particular geographical location where the heat pump system is to be used and which the present invention will follow on a substantially continuous basis to control the initiation of defrosting of the outdoor coil on an optimum, cost-effective basis.

Figure 4:
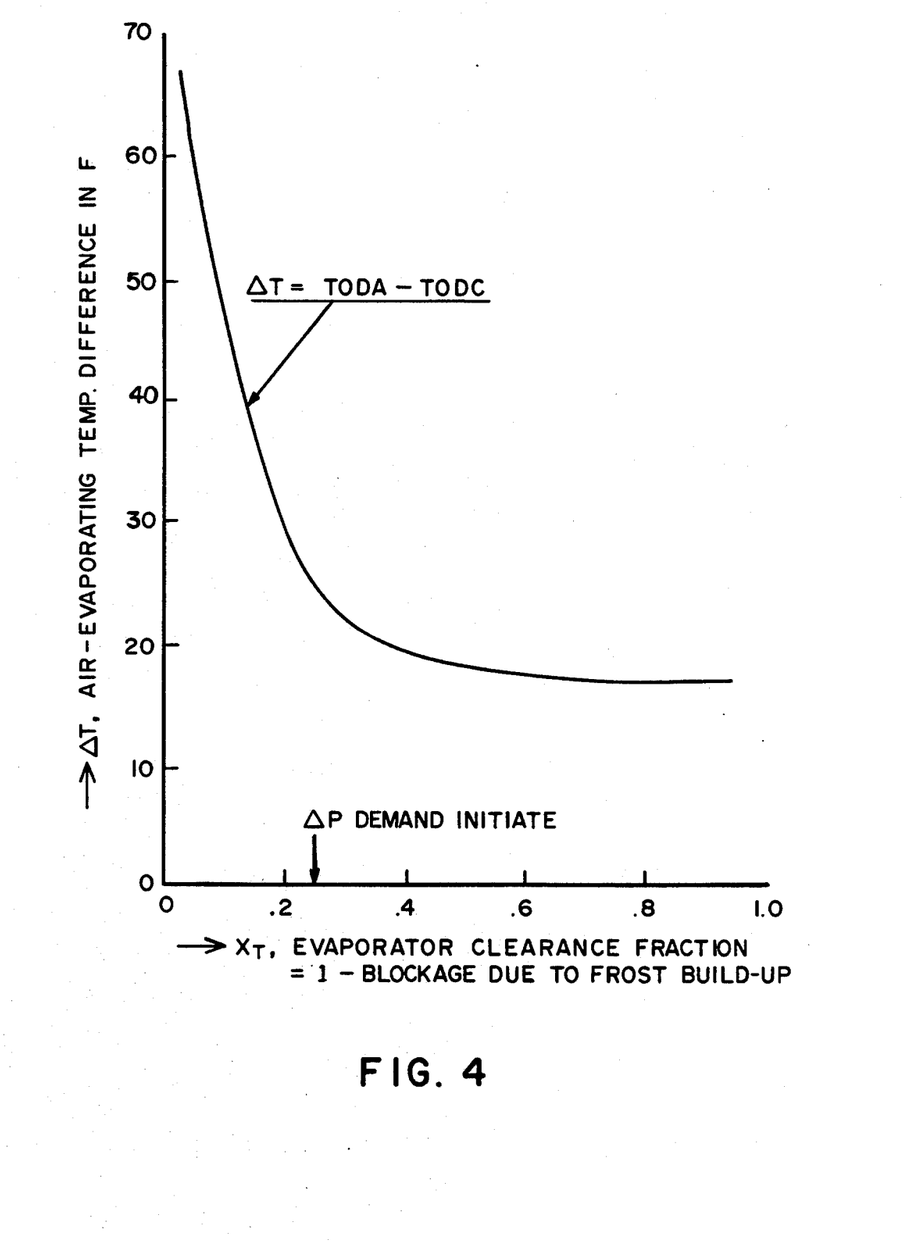
FIG. 4 is a graph showing the typical relationship between a differential temperature $\Delta T$ representing the difference between the outdoor air temperature and the temperature of the outdoor coil as a function of blockage of the outdoor coil caused by the buildup or accumulation of frost thereon. The graph of FIG. 4 is for one particular value of outdoor air temperature; the curve shifts upwardly as outdoor air temperature increases and downwardly as outdoor temperature decreases.

FIG. 4 depicts, for a typical value of outdoor air temperature, a graph of $\Delta T$, defined as outdoor air temperature minus outdoor coil temperature plotted as a function of the outdoor coil/evaporator clearance fraction $X_T$, which is defined as 1.0 minus the blockage of the coil due to frost build-up. It will be noted that this is a non-linear relationship and that, in particular, as the coil blockage increases beyond 60 to 70% (corresponding to $X_T$ being 0.4 to 0.3) then the value of $\Delta T$ becomes much greater for each increment on the horizontal axis. Our invention utilizes this phenomenon advantageously to provide a backup defrost initiation independent of the primary system responsive to the magnitude of the outdoor air temperature. Thus, we provide a backup defrost when the blockage reaches a predetermined level which we detect/measure by measuring $\Delta T$. We have found a desirable $\Delta T$ set point is that corresponding to an 85% coil blockage. As explained above, for each value of outdoor air temperature there is a unique curve for the function depicted in FIG. 4, and accordingly, at the 85% coil blockage point, there will be a different $\Delta T$ value for each value of outdoor air temperature. For example, $\Delta T$ for an outdoor air temperature of 40° F. will be substantially higher than the $\Delta T$ for an outdoor air temperature of 20° F.

Figure 2A:
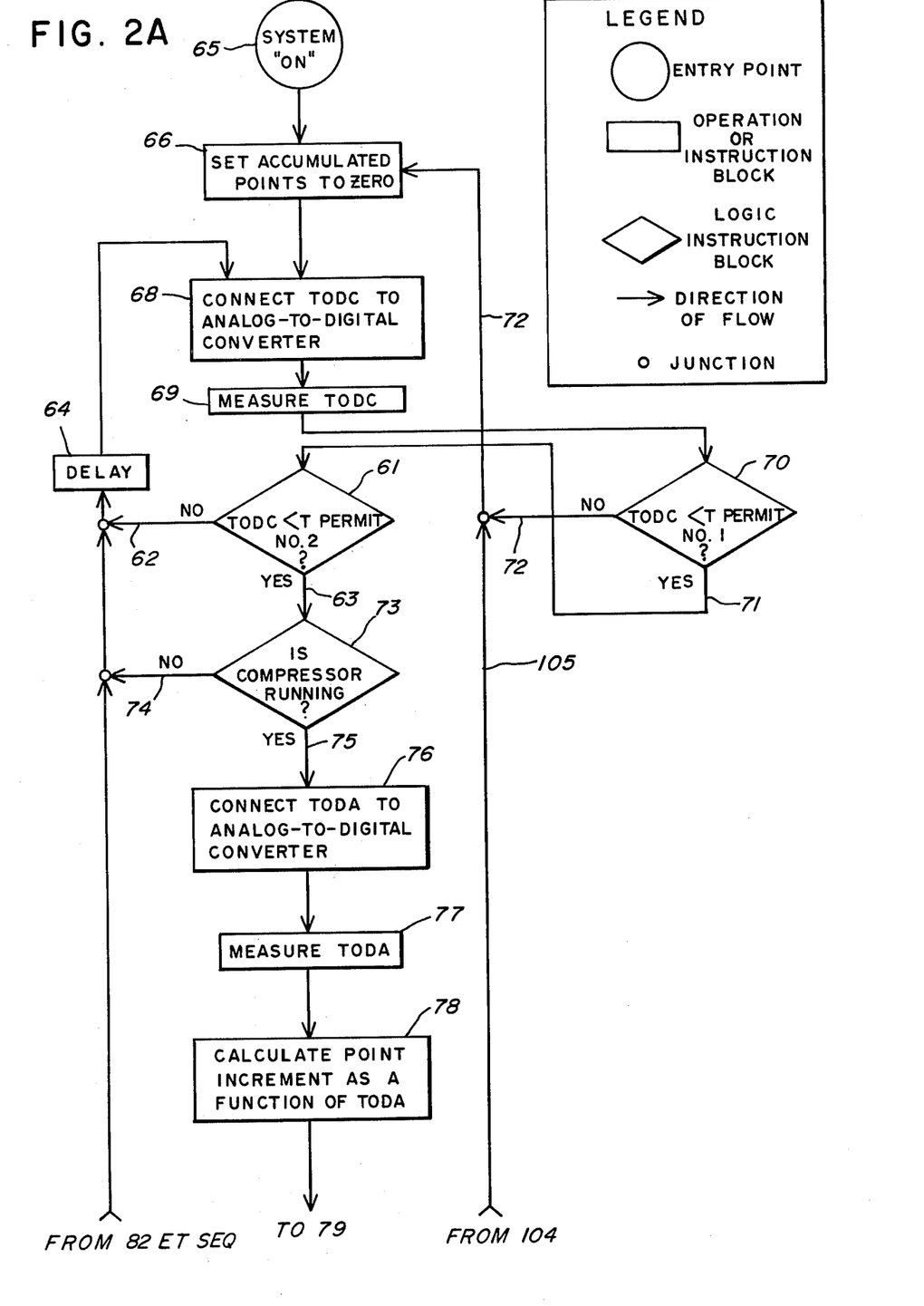
FIGS. 2A and 2B comprise a flowchart for the control of the microprocessor depicted as one of the elements in the system of FIG. 1.
Figure 2B:
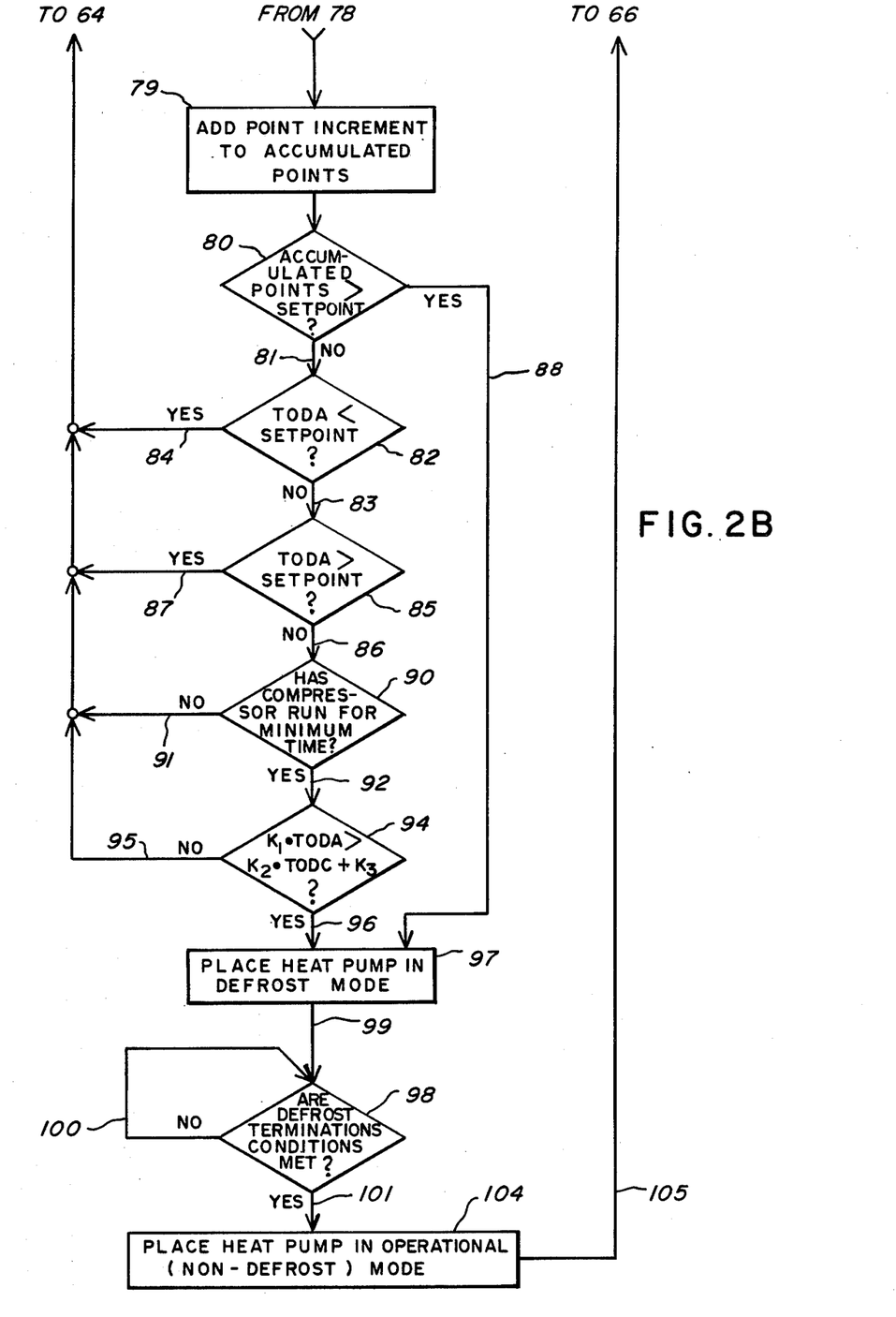

The detailed operation of the defrost control system of FIG. 1 may be more specifically understood by reference to the flowchart depicted in FIGS. 2A and 2B; this flowchart shows the operation of microprocessor 50 related to the defrost control system.

After the heat pump system is turned "on", i.e., becomes operational (this is indicated by numeral 65 in FIG. 2) then operation 66 is to set accumulated points to zero; the expression "accumulated points" will be explained below. The flow from instruction block 66 is to another instruction block 68 "connect TODC to analog to digital converter" which in turn flows to another instruction block 69 "measure TODC," which in turn flows to a logic instruction block 70 "TODC (outdoor coil temperature) less than T permit 1?". "T permit 1" is a preselected temperature value, which typically would be 38° F.

If outdoor coil temperature is greater than T permit 1, then a "no" response causes flow from block 70 via 72 to instruction block 66. As long as outdoor coil temperature is above the T permit 1, no frost can accumulate on the outdoor coil and obviously, there is no need for defrost action. If, however, outdoor coil temperature is less than T permit 1, then the "yes" response from block 70 causes flow via 71 to a logic instruction block 61 "TODC (outdoor coil temperature) less than T permit 2?" "T permit 2" is a preselected value of outdoor coil temperature, typically 32° F., a value at which and below which frost can form on the outdoor coil independently of the value of outdoor air temperature. If outdoor coil temperature is greater than T permit 2, then a "no" response of block 61 causes flow via 62 to a delay means and from same, after a short delay (typically 1/60th second), to instruction block 68, the system recycling until TODC is less than T permit 2; when the latter temperature condition occurs then a "yes" response of block 61 causes flow via 63 to a logic instruction block 73 "is compressor running?" As indicated, the microprocessor receives the data for this logic decision from thermostat 42 via connection 44. If the compressor is not running, then the logic "no" response causes flow via 74 and through delay means 64 to instruction block 68 and the subsystem thus far described will periodically recycle with no defrost function being commanded because either the outdoor coil temperature is greater than T permit 2 and/or the compressor 14 is not running. However, assuming that both the outdoor coil temperature is less than T permit 2 and the compressor is running, then the "yes" response of logic block 73 causes flow via 75 to an operation or instruction block 76 "connect TODA to analog to digital convertor," the flow from which is to instruction block 77 "measure TODA", the flow from which is to instruction block 78 "calculate point increment as function of TODA," the flow from which is to instruction block 79 "add point increment to accumulated points," the flow from which is to logic instruction block 80 "accumulated points greater than set point?." The expression "set point" refers to a predetermined number of points set into the program of the microprocessor which represents the number of points which must be accumulated (as will be explained below) by logic instruction block 80 so as to initiate a defrost mode of operation of the heat pump system. The microprocessor is further programmed so that for each incremental value of outdoor air temperature, different point values will be assigned for use in the calculation function of instruction block 78 (to be described below) as a function of the control line X as depicted in FIG. 3. Thus, for each cycle of operation of the defrost control system, i.e., the incremental checking of the various parameters of outdoor coil temperature, compressor operation, and outdoor air temperature at a substantially continuous basis (e.g., once each 1/60th of a second), the operation of blocks 77, 78 and 79 results in a gradual accumulation of points as is represented by block 80. Typically, in the early part of a heating mode (when the frost has not built up to an objectionable thickness), the accumulated points would be less than the value of the set point; and accordingly, the logic response from Block 80 would be "no"; however, as time elapses, the summation of the incremental points for each cycle of the logic system will aggregate the value of the setpoint of logic instruction 80 and then the response instruction therefrom will be a "yes" which is applied via a connection 88 to an instruction block 97 "place heat pump in defrost mode" to thus initiate defrost of the heat pump. This is accomplished in the system of FIG. 1 by the connection 60 from microprocessor 50 to the control means 18 for the reversing valve 16; i.e., a "yes" response applied to block 97 will cause (via 50 and 60) the reversing valve to operate to a "cooling mode" position to direct the hot compressed refrigerant from the discharge part of the compressor 14 to be directed to the outdoor coil so as to raise the temperature thereof and thus melt off the accumulated frost. It will be understood that the scope of this invention covers other forms of means for effecting the defrost, once a requirement for defrost has been established.

A "no" logic response of block 80 causes flow via 81 to another logic instruction block 82 "TODA less than set point?," the "setpoint" of logic instruction block 82 being a low outdoor air temperature lockout setpoint for the $\Delta T$ defrost function; i.e., for lockout or disabling of the $\Delta T$ defrost function at an outdoor air temperature below a preselected value, a typical value being minus 20° F. The $\Delta T$ defrost function will be explained in greater detail below in connection with a discussion of logic instruction block 94. Logic instruction block 82 has a "yes" response 84 flowing via delay means 64 to block 68 and a "no" logic response causing flow via 83 to a logic instruction block 85 "TODA greater than set point?," the expression "set point" as used for this logic instruction having reference to an outdoor air temperature which is set into the memory of the microprocessor 50 (a representative value would be 36° F.) and which functions as a high ambient outdoor air temperature lockout of the $\Delta T$ defrost function. A "no" response from logic block 80 thus is applied via the "yes" response of block 82 and delay means 64 to the block 68 to initiate another cycle of processor operation; again, this recycling occurs very rapidly (as indicated, we use 60 times a second) so it can be said that the magnitude of the outdoor air temperature as sensed by TODA 31 is being used on a substantially continuous basis to control the duration of the timing function, following which the heat pump is defrosted.

Logic instruction block 85 has a "yes" logic response 87 flowing via delay means 64 to instruction block 68. A "no" logic response causes flow from 85 via 86 to a logic instruction block 90 "has compressor run for minimum time?," a "no" logic response causes flow from 90 via 91 and delay means 64 to block 68, and a "yes" logic response causes flow via 92 to the $\Delta T$ defrost control logic instruction block 94 labled in FIG. 2B as "$K_1 \times$ TODA greater than $K_2 \times$ TODC plus $K_3$?." Logic instruction block 94 provides a control as a function of the $\Delta T$ measurement; i.e., the measurement of the difference between outdoor air temperature as sensed by TODA 31 and the outdoor coil temperature as measured by TODC 34. If the left side of the equation as depicted in block 94; i.e., $K_1 \times TODA$ is greater than the right-hand side of the equation, i.e., $K_2 \times TODC$ plus $K_3$ then a "yes" logic response causes flow via 96 to instruction block 97 "Place heat pump in defrost mode"; if the value on the left hand side of the equation is less than the value on the right-hand side of the equation, then a "no" logic response flows via 95 through delay means 64 to the instruction block 68.

In our system, the equation of instruction block 94 is arranged so that a "yes" instruction will be produced for a $\Delta T$ corresponding to blockages of 90%. This is a significant difference as compared to prior art $\Delta T$ systems which could be set no higher than a 70 to 75% coil blockage equivalent $\Delta T$ because, to do so, too many compressor run hours would occur with a blocked coil, thereby reducing operating efficiency. In our invention a 90% coil blockage setting for $\Delta T$ is available because the variable timer defrost control (control of instruction block 97 by logic block 80 via 88) prevents, due to its periodic defrosting, the compressor from compiling many operating hours with a blocked coil. The advantage of the 90% setting is that the size or magnitude of the $\Delta T$ signal at a 90% coil blockage is about three times that of a clear coil $\Delta T$ in contrast to a 75% coil blockage $\Delta T$ signal being only about 1.5 times that of a clear coil $\Delta T$; our concept therefore provides a much larger error signal to use for control purposes, a very significant advantage.

Once the heat pump is placed in the defrost mode of operation, then this mode will continue until any one of a plurality of defrost termination conditions is met. This is represented in FIG. 2B by the flow from instruction block 97 flowing via 99 into logic instruction block 98 "are defrost termination conditions met?"; instruction block 98 having a "no" logic response causing flow via 100 back to the input 99 thereof and a "yes" response causing flow to an instruction block 104 "Place heat pump in operational (nondefrost) mode." Again, this would be accomplished by control from the microprocessor 50 being imposed on the control means 18 of reversing valve 16 to operate the valve to a "heating mode" position. Also, a signal is applied via 105 from instruction block 104 to the input of instruction block 66 "set accumulated points to zero" to reset the variable timer defrost system. Referring again to logic instruction block 98, typical defrost termination conditions are (i) the value of outdoor coil temperature as sensed by TODC (we have found 55° F. advantageous), (ii) elapsed time of defrost mode, and (iii) refrigerant pressure reaching a preselected value.

In partial summary, it is seen that instruction block 97 "Place heat pump in defrost mode" is enabled in two ways: (i) from logic block 80 via connection 88 and (ii) from logic block 94 via "yes" response 96, which respectively represent the initiation of defrost of the heat pump as a function of 1. a variable timer, the duration of the timing being a function of outdoor air temperature, and
2. defrost commanded as a function of the magnitude of $\Delta T$.

The $\Delta T$ mode or method of initiating defrost may be modified by the functions of logic instruction blocks 82 and 85. The Block 82 function serves to lock out the $\Delta T$ defrost function if outdoor air temperature is below a preselected value; e.g., 20° F. Block 85 functions to lock out the $\Delta T$ defrost function if the outdoor temperature is above a preselected value.

As indicated above, an Intel Model 8049 microprocessor may be used to practice the subject invention; as an assistance reference may be made to "INTEL$^R$ MCS-48$^{TM}$ Family of Single Chip Microcomputers—User's Manual," a 1978 copyrighted manual of the Intel Corporation, Santa Clara, Calif. 95051. As a further assistance, Appendix A hereto and forming a part hereof, comprises a table of machine readable instruction for controlling the aforesaid Intel Model 8049 microprocessor for use in the present invention.

Another aspect of our invention is that at any time in the process of the accumulation of points by block 80, the compressor may be de-energized because the room thermostat 42 is no longer calling for heat; for this case the accumulated points will be retained by block 80. Upon the next operation of the heat pump in the "heating mode," the stored points will be the starting point for the summation process. The only exception for this is if the outdoor coil temperature rises above a preselected value; i.e., T permit 1 which, as explained above, may advantageously be set at about 38° F.; in this case, the no response 72 from instruction block 70 flows to block 66 to set all accumulated points to zero.

Those skilled in the art will further recognize that the outdoor coil temperature may be sensed, as discussed above with a temperature sensing means or may be derived from secondary information such as the pressure of the fluid in the outdoor coil; accordingly, the expression "outdoor temperature sensing means" should be construed herein to include all means which either directly or indirectly produce an output indicative of the temperature of the outdoor coil.

The expression "coil blockage" as used herein, e.g., vis-a-vis FIG. 4, has reference to the blockage of the coil by accumulated frost and is measured as a function of the airflow through the air spaces of the coil; more specifically, "percentage coil blockage" is defined as the ratio of the difference between the air pressure differential across the outdoor coil at any time and the pressure differential under clear coil conditions to the difference between the pressure differential under fully frosted conditions and the clear coil pressure differential.

While we have described a preferred embodiment of the invention, it will be understood that the invention is limited only by the scope of the following claims:

We claim:

1. An outdoor coil defrost control system (hereinafter "defrost control system") for a reverse cycle refrigeration system (hereinafter "system") for heating and cooling a building wherein said system comprises refrigerant compression means, an indoor coil, an outdoor coil, and refrigerant conduit means connecting said compression means and said coils, said defrost control system comprising:

outdoor air temperature sensing means (hereinafter "TODA") having an output indicative of outdoor air temperature;
   outdoor coil temperature sensing means (hereinafter "TODC") having an output indicative of the temperature of said outdoor coil;
   means (hereinafter "COM") operatively associated with said compression means and adapted to have an output indicative of the operation of said compression means; and
   controller means having operative connections to said TODA, TODC, and COM so as to receive the outputs thereof, said controller having a timing function which is initiated upon (i) the outdoor coil temperature as sensed by TODC being at or below a preselected value and (ii) said compression means being operated, the duration of said timing function being determined on a substantially continuous basis by the magnitude of the outdoor air temperature as sensed by TODA, and said controller means having an operative connection to said system and being adapted, upon completion of said timing function, to place said system into an outdoor coil defrost mode of operation.

2. Apparatus of the claim described in claim 1 further characterized by said controller means including means operative to place said system into an outdoor coil defrost mode independent of the completion of said timing function, said additional defrost control means being adapted to initiate an outdoor coil defrost mode of said system upon the outdoor air temperature exceeding the outdoor coil temperature by a predetermined amount.

3. Apparatus of claim 2 further characterized by the initiation of the additional defrost occurring upon the outdoor air temperature exceeding the outdoor coil temperature by an amount indicative of an outdoor coil frost blockage of at least 85%.

4. Apparatus of claim 1 further characterized by said controller means including special terminate means for interrupting the timing function after initiation thereof and for preventing the placement of said system into an outdoor coil defrost mode of operation, said special terminate means becoming effective upon the outdoor coil temperature as sensed by TODC being at or above a preselected value.

5. Apparatus of claim 2 further characterized by said additional defrost control means being disabled upon the temperature of the outdoor air as sensed by TODA being at or below a preselected value.

6. Apparatus of claim 2 further characterized by said additional defrost control means being disabled upon the temperature of the outdoor air as sensed by TODA being at or above a preselected value.

7. Apparatus of claim 2 further characterized by said predetermined amount (of difference between the outdoor air temperature and the outdoor coil temperature) being determined by said controller means as a function of the magnitude of the outdoor air temperature.

8. Apparatus of claim 7 further characterized by the initiation of the additional defrost occurring upon the outdoor air temperature exceeding the outdoor coil temperature by an amount indicative of an outdoor coil frost blockage of at least 85%.

9. Apparatus of claim 7 further characterized by said controller means including special terminate means for interrupting the timing function after initiation thereof and for preventing the placement of said system into an outdoor coil defrost mode of operation, said special terminate means becoming effective upon the outdoor coil temperature as sensed by TODC being at or above a preselected value.

10. Apparatus of claim 7 further characterized by said additional defrost control means being disabled upon the temperature of the outdoor air as sensed by TODA being at or below a preselected value.

11. Apparatus of claim 7 further characterized by said additional defrost control means being disabled upon the temperature of the outdoor air as sensed by TODA being at or above a preselected value.

* * * * *